United States Patent
Kristensen et al.

(10) Patent No.: US 7,364,767 B2
(45) Date of Patent: Apr. 29, 2008

(54) FOOD ADDITIVE

(75) Inventors: Henrik Stamm Kristensen, Murcia (ES); José Navarro Perez, Murcia (ES)

(73) Assignee: Premium Ingredients, S.L., De Segura (ES)

( * ) Notice: Subject to any disclaimer, the term of this patent is extended or adjusted under 35 U.S.C. 154(b) by 0 days.

(21) Appl. No.: 10/507,431

(22) PCT Filed: Dec. 30, 2002

(86) PCT No.: PCT/ES02/00622

§ 371 (c)(1),
(2), (4) Date: Apr. 18, 2005

(87) PCT Pub. No.: WO03/075682

PCT Pub. Date: Sep. 18, 2003

(65) Prior Publication Data

US 2005/0170061 A1 Aug. 4, 2005

(30) Foreign Application Priority Data

Mar. 11, 2002 (ES) ................................. 200200569

(51) Int. Cl.
*A21D 2/16* (2006.01)

(52) U.S. Cl. ..................................... 426/654; 426/573
(58) Field of Classification Search ................ 426/654
See application file for complete search history.

(56) References Cited

U.S. PATENT DOCUMENTS 6,949,256 B2 * 9/2005 Fonkwe et al. ............. 424/451

FOREIGN PATENT DOCUMENTS

| CN | 1238138 A | 12/1999 |
| EP | 0649599 A1 | 4/1995 |
| ZA | 9202101 A | 2/1994 |

OTHER PUBLICATIONS

EFEMA Index of Food Emuslfiers. 3$^{rd}$ Edition. Published Nov. 1999. p. 41-45, 81-85, and 111-115.*
International Search Report from EPO; Apr. 7, 2003.
English language abstract of CN1238138A; Dec. 15, 1999.

* cited by examiner

*Primary Examiner*—Anthony Weier
(74) *Attorney, Agent, or Firm*—Arent Fox LLP

(57) ABSTRACT

The invention relates to a food additive having carraghenate ι and sodium stearyl-2-lactylate (SSL). The inventive food additive, which has emulsifying and/or stabilising properties, can be used in the food industry and in the production of food products.

44 Claims, 1 Drawing Sheet

FOOD ADDITIVE

CROSS-REFERENCE TO RELATED APPLICATIONS

This application claims priority under 35 USC § 371 based upon PCT/ES02/00622 filed Dec. 30, 2002, and under 35 USC § 119 based upon Spanish Patent Application P200200569 filed on Mar. 11, 2002.

OBJECT OF THE INVENTION

The invention falls into the category of the technical food sector and is a food additive, has emulsifying and/or stabilising properties and contains sodium stearyl-2-lactilate and a carragenate.

BACKGROUND TO THE INVENTION

The food industry uses a variety of additives (antioxidants, dyes, preservatives, sweeteners, emulsifiers, thickeners, stabilizers, flavourings, etc.) when preparing numerous food products.

Emulsifiers are used in the food industry when preparing a variety of products (sausage, pates, cheese for melting, fillings, etc.) with a view to creating an emulsion or for improving the colloidal stability, by reducing the aggregation or coalescence rate of the scattered particles. Natural emulsifiers are among the most common types of emulsifiers, for example lecithin, and those of synthetic origin, for example, monoglycerides, diglycerides and derivatives, for example, certain fatty acids, etc.

Stabilisers are added to the food products in order to prevent them from undergoing changes. The following are the most extensively used stabilisers in the food industry: gums, starches, dextrins, proteins, etc.

As is well known, the emulsifiers that are generally used in the food industry do not provide the stability required for emulsified meat products, so use is made of proteins that can be used for the purpose, which increases the cost of the final food product. In this sense, the proteins that are most extensively used are sodium caseinate and the soya protein in isolation. Sodium caseinate is obtained from skimmed milk, and 32 liters of skimmed milk are needed to obtain 1 kg of sodium caseinate, by means of a procedure that involves precipitating with hydrochloric acid, the lactic protein sensitive to acid. The precipitate of casein acid is neutralised with sodium hydroxide and is then dried by atomising, extrusion or by means of a roller system.

The soya protein in isolated form is obtained from soya flour whose fat has been removed by precipitation. Its emulsifying capacity is lower than caseinate, so greater proportions are generally used, usually 30% more, which has an effect on the end product. Furthermore, there is the disadvantage of it having a flavour that is undesirable (it tastes of soya).

Apart from sodium caseinate and the soya protein in isolated form, the use of emulsifiers from the citric ester family of monoglycerides and diglycerides from fatty acids has also been described for some hot emulsified products, these having a water/oil emulsifying effect. Because of their hydrophilic nature, the esters from monoglyceride citric acid can stabilise certain meat preparations, such as liver pâté. Pâtés are manufactured by mixing liver, fat and water at a temperature ranging from 40° C. to 45° C., at which the esters, in combination with the proteins in the liver, increase the stability during the interphases where the proteins act as supplementary hydrophilic stabilisers. However, the monoglyceride and diglyceride citric esters in fatty acids do not operate in cold temperatures.

Furthermore, a description has also been given of the use of sorbitane acids from fatty acids to improve the cold emulsifying potential of oil in water for sauces and mayonnaise with a low oil content.

In spite of the effort that has been made, it has not yet been possible to develop any formula based upon emulsifiers authorised by the food legislation for fatty acid family, regardless of whether they are glycerides or other esters, with emulsifying activity, which are capable of forming cold water/oil emulsions either with raw animal fat or other fats or oils used for food.

DESCRIPTION OF THE INVENTION

This invention deals with the problem of providing a food additive, with emulsifying and/or stabilising properties, which is useful for forming and/or stabilising water/oil emulsions, either in a hot or cold state, using raw animal fat or other fats or oils used as food.

The solution provided by this invention is based on it having been observed that a mixture consisting of sodium stearyl-2-lactilate (SSL) and the iota form of carragenate (carragienate ι) makes it possible to form and/or stabilise cold water/oil emulsions with raw animal fat or with other fats or oils used as food. The food additive, with emulsifying and/or stabilising properties, provided by this invention has emulsifying properties that are better than those of sodium caseinate and the soya protein in isolated form, which is of special benefit to the meat industry, which prepares many products that are emulsified/cooked with percentages of fat greater than 30%.

DETAILED DESCRIPTION OF THE INVENTION

The invention provides a food additive, with emulsifying and/or stabilising properties, hereinafter referred to as the invention, which contains sodium stearyl-2-lactilate (SSL) and carragenate ι.

The weighted ratio SSL:carragenate ι can vary within a wide range, depending on the use and application to which the additive for the invention is put.

Figure 2:
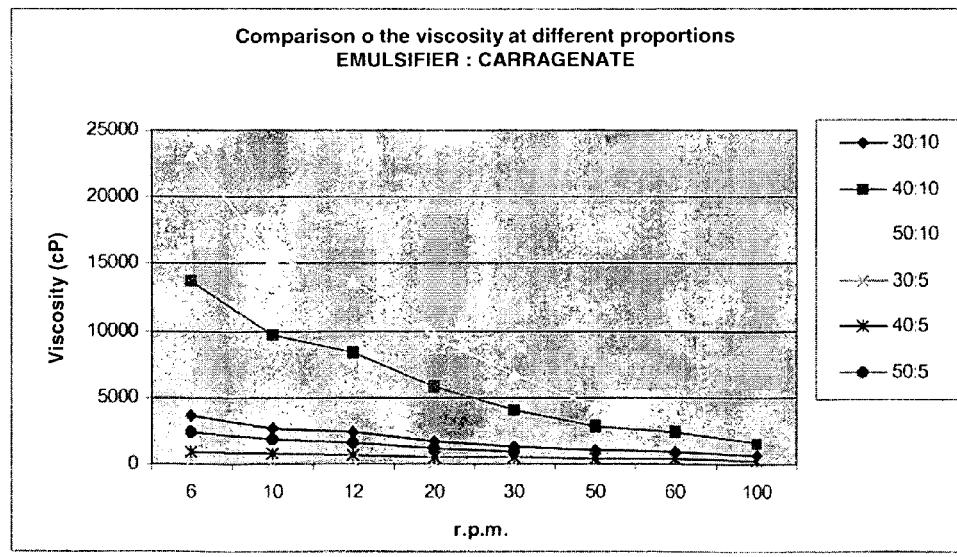
FIG. 2 is a graph that shows the variation in the viscosity of the additive that is the subject of the invention with different proportions of emulsifier: carragenate, where the emulsifier is SSL and the carragenate is carragenate ι. The viscosity measurements have been taken with the aid of a Brookfield type viscosimeter at 25° C.

In one specific realisation, the SSL:carragenate ι ration, in weight, ranges from 0.1:1 to 15:1, for example, between 1:1 and 10:1. In one specific realization of this invention, the weighted ratio SSL:carragenate ι in the additive for the invention is 5:1, and this ratio is consistent with the maximum viscosity (See FIG. 2) and, therefore, the ratio at which the additive for the invention yields its best characteristics as an emulsifier (taking the maximum viscosity developed to be the maximum rate of activity as an emulsifier).

As an alternative, other SSL:carragenate ι proportions by weight can be established, depending on the purpose to which the additive subject of the invention is to be put, even if they are not the optimum stequiometry ones from the perspective of its emulsifying nature. In this sense, by increasing the amount of carragenate and reducing the amount of SSL, for example, in a ratio SSL:carragenate ι, in weight, ranging from 1:0.1 to 1:10. typically in a ratio SSL:carragenate ι, in weight, of 1:1.6, a range of additives with greater stabilising characteristics can be obtained, making it suitable to be applied as a stabiliser (binder) for sausage cured in the form of purées at 5-8% in weight. These purées, applied at 5-10% in weight to a mass of minced meat, provide brightness and binding properties in a similar way to the caseinate purées at 14% that have already been used.

The SSL, expressed by the following formula

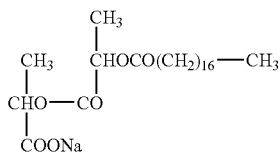

is an ionic emulsifier that is highly functional in oil in water and water in oil emulsions if it is included and spread evenly. Its limited solubility in water at low temperatures considerably reduces its effectiveness in cold meat emulsions (which most of them are). However, if a totally or partially neutralised type of SSL is prepared this makes it possible to change the dispersability at the aqueous phase, which it joins with an impalpable texture that is clearly more active than the SSL generally available on the market, which are not very neutralised. The SSL is a commercial product produced or supplied by a variety of companies, for example, Palsgaard (Denmark).

Carragenate ι is a mixture of sulphated polysaccharides that possess repetitive units of 4-sulphate-β-D-galactopyranosil(1→4)-α-D-galactose joined by links (1→3), in which the galactose units are units of 3.6-anhydro-α-D-galactose-2-sulphate. In one particular realisation, the carragenate ι used is the carragenate ι extracted from the seaweed *Espinosum*. Carragenate ι is a commercial product that can be acquired from a variety of companies, for example, CP-Kelco, Shemberg, etc. Carragenate ι is generally commercialised supported by an inert support, for example, maltodextrin.

Figure 1:
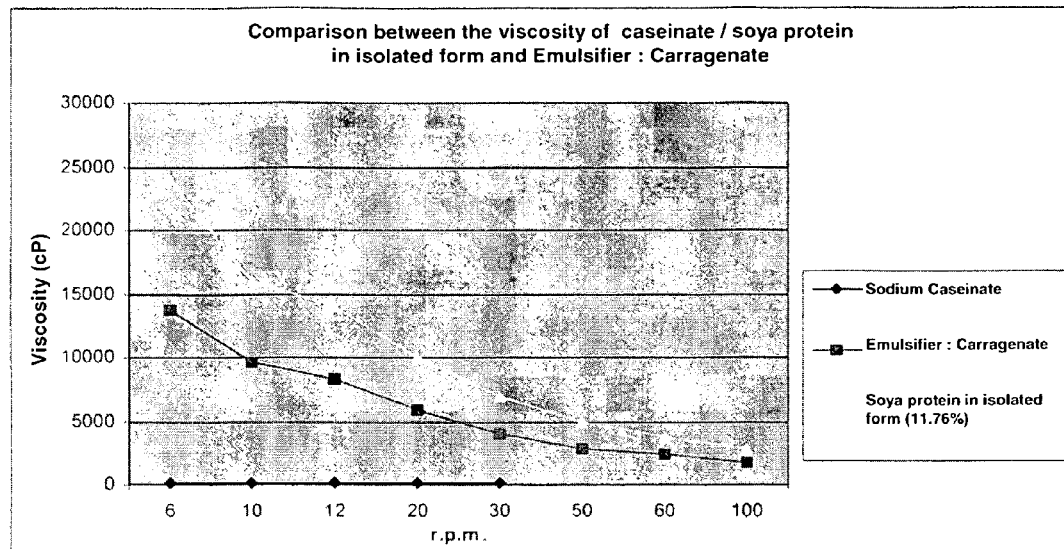
FIG. 1 is a graph that shows the viscosity of the additive that is the subject of the invention (emulsifier: carragenate, where the emulsifier is SSL and the carragenate is carragenate ι, to a weighted ratio of 4:1) compared with that of sodium caseinate and the soya protein in isolated form. The viscosity measurements have been taken with the aid of a Brookfield type viscosimeter at 25° C.

When the SSL is mixed, preferably totally or partially neutralised, with the carragenate ι, the additive that is the subject of this invention is obtained, and this is a new product that has a synergic effect whose properties and characteristics are clearly different from those of each one of its individual components. In this sense, the neutralised SSL, used in the normal proportions for preparing purées (7% in weight) for application in the meat industry has a viscosity that is irrelevant, less than 100 centipoise (cP), whereas when it is mixed with the carragenate ι the viscosity is very high, greater than 22,000 cP at 25° C. [See FIG. 1, which shows the viscosity of the additive of the invention (SSL:carragenate ι, with a weighted ratio of 4:1) compared to that of sodium caseinate and soya protein in isolated form].

Furthermore, the same proportion of carragenate ι in water that produces the high viscosity of 22,000 cP, does not develop a viscosity greater than 100 cP (irrelevant) if the SSL is not present.

One of the advantages of the additive for the invention is that it has a dispersion capacity in cold water in concentrations that are much greater than those that are going to be used in food formulae, and, furthermore, the emulsification of the fat generally takes place in a more stable way than when using sodium caseinate or soya protein in isolated form, at half the proportion of the latter proteins and at a considerably lower cost. Studies conducted by the applicant have revealed that in general, (i) the recommended proportion of sodium caseinate for use in the meat industry is, approximately, twice that of the additive that is the subject of the invention and that the cost of applying sodium caseinate is also twice as high; and (ii) although the cost of the soya protein in isolated form is roughly 20% less than the additive that is the subject of the invention, because it has to be used in much greater quantities than those required for the additive that is the subject of the invention (due to its low emulsifying capacity), the cost of applying the soya protein in isolated form is about 40% higher than the cost of applying the invention.

If one wishes to, one can increase the emulsifying capacity for the additive that is the subject of the invention by replacing part of the SSL with one or more sucroesters (mono or polyesters of fatty acids and saccharose). Sucroesters are non-ionic emulsifiers with a wide range of applications, in which the aquilic chain of the fatty acid is the apolar fraction of the molecule, whereas the saccharose, in view of the polarity that is bestowed upon it by the hydroxyl groups that do not react, constitutes the hydrophilic fraction, so sucroesters with a great variety of HLBs are obtained, depending on the number esterified hydroxyls and the lengths and chains of the fatty acids concerned. In this invention, these sucroesters serve to strengthen the mixture of carragenate ι and SSL where the emulsifying properties and movement of the hydrophil-lipophil balance is concerned. The following is a non-exhaustive list of the examples of sucroesters that can be used with this invention: saccharose stearate, saccharose palmitate, saccharose oleate, etc. If the additive that is the subject of the invention contains one or more sucroesters, the total amount of sucroester(s) that can be present in the additive that is the subject of this invention can range considerably, depending on the strength and difference in the emulsifying effect that one wishes to apply to the carragenate ι and SSL mixture. In one specific realisation, the additive that is the subject of this invention contains SSL, sucroester and carragenate ι, at a weighted ratio of SSL:sucroester:carragenate ι of 4:1-1.5:1.

Furthermore, if one wishes to do so, the dispersion capacity of the additive that is the subject of the invention can be increased at the aqueous phase, by adding sodium stearate to the SSL mixture (optionally together with the sucroester) and carragenate ι. In one particular realization, the additive that is the subject of this invention ranges from 1 to 10% in weight, with respect to the weight of SSL, of sodium stearate.

The additive that is the subject of this invention can be obtained following the procedure that involves mixing the SSL, preferably totally or partially neutralised, with the carragenate ι, optionally supported on an inert support (especially if it is going to be used as a dispersible powder). The SSL can be neutralised by adding a suitable base to the liquid SSL, for example by adding sodium carbonate to SSL melted at 45° C. The carragenate ι could optionally be supported on an inert support, such as maltodextrin. The mixture between the neutralised SSL and the carragenate ι can be achieved by any conventional method, for example, by pulverising the SSL liquid with sodium carbonate at 45° C.—which by way example, could come from a pressurised tank—, on the carragenate ι, optionally supported on the maltodextrin, and shaken. The resulting mixture is then sifted and packaged so that it can be used as a dispersible powder.

The additive that is the subject of this invention can be used, amongst other applications, for preparing purées used in the food industry, which constitute an additional purpose for this invention. The amount of additive in the invention allocated to food formulae can vary within a wide range, depending on the nature of the food product, for example:
  a) in emulsified sausage: between 0.4 and 0.7% in weight of additive for the invention, with 50% maltodextrin, hereinafter referred to as additive 50% MD, applied in the form of a purée with part of the water from the formulation (20%), as is described in Example 2; and
  b) in cured sausage: between 0.3 and 0.7% in weight of additive 50% MD, applied in the form of a purée with 3 to 7% of additive 50% MD in water, and mixing the purée with the rest of the mixture.

For others, such as sauces, fillings, melted cheese and food preparations in general, the additive that is the subject of this invention can be applied directly, premixed with other texturisers or dissolved in part of the water used in the formula, in one proportion, with respect to the end product, ranging from 0.2 and 1% in weight.

The invention also provides a food product that contains an additive from the invention. This food product can be any food product that contains a food emulsion, for example, a derivative of meat, a sausage, a pâté, a melted cheese, etc. The amount of additive for the invention that is present in this food product may range widely, depending on the nature of the food product and on the additive used, amongst other factors. In one particular realization, the inclusion of the additive that is the subject of this invention in a proportion of 0.5-0.6% in weight in a meat preparation brings about complete stabilisation of the fat after all the components have been mixed in a cutter, until they constitute a fine paste with impalpable grain, at a temperature ranging from 6° C. to 14° C. The resulting paste shows no evidence of fat separation when put into sausage skin and cooked at a temperature of 85° C.

The following are among the food products that can contain the additive that is the subject of this invention:
  Emulsified sausage: 0.3-0.7% of additive 50% MD;
  Cured sausage: 0.3-0.7% of additive 50% MD;
  Melted cheese: 0.2-0.8% of additive 50% MD;
  Sauces: 0.3-0.8% of additive 50% MD;
  Fillings: 0.2-0.8% of additive 50% MD (the term "filling" is to be understood as meaning a mixture of water, fat, texturisers and raw materials such as tuna, cheese, etc., processed so they can be put into pastry, etc., as well as others that are sweet, such as chocolate, cream, etc.); and other food preparations such as pre-cooked foods, croquettes, soups and certain doughs for making bread and buns: 0.2-0.8% of additive 50% MD.

Furthermore, and in a similar way to the proteins (sodium caseinate and soya protein in isolated form), the additive that is the subject of this invention can be applied in the form of a purée at 5-8%, typically with 7% in cold water, prepared in the same cutter, in which once the additive that is the subject of this invention is hydrated, the meat component is added. If it is to be used with another type of product such as melted cheese, fillings, etc. the purée can be prepared in any high-speed blender and kept so that it can be included at the time of use, in whatever sequence the process might require.

The following are used merely as examples used to show the invention, and should not be considered in any way exhaustive where the scope of the invention is concerned.

EXAMPLE 1

Preparation of an Additive Subject of the Invention

An additive subject of the invention was prepared in the form of a dispersible powder using the procedure that is described below. An aqueous solution of SSL was prepared and the SSL was neutralised by adding solid sodium carbonate to the aforementioned aqueous solution of SSL, in the form of a fine powder, in the estequiometric amount suitable for neutralising the SSL, at a temperature of approximately 45° C., so the pH rose from 5.2 to 6.5. The resulting liquid phase was mixed with carragenate ι supported with a maltodextrin, by pulverising at that liquid phase (kept in a pressurised tank) at 45° C. with the maltodextrin/carragenate, shaking at high speed and with the aid of an intensifier in Diosna facilities, the mixture reaching an eventual temperature of 33-35° C. The resulting mixture was cooled down to 25° C. and the product (additive) as sifted and packaged for use as a dispersible powder.

Additives that are the subject of the invention with different weighted ratios of SSL:carragenate ι. can be obtained by varying the relative amounts of SSL and carragenate ι.

EXAMPLE 2

Preparing a Fine Paste

The fine paste that is shown in Table 1 was prepared, the only variation being, the emulsifier used, either the additive subject of the invention (SSL:carragenate ι), sodium caseinate or soya protein in isolated form.

TABLE 1

Preparation of fine pâté

| | with additive in the invention (%) | with sodium caseinate (%) | With soya in isolated form (%) |
| --- | --- | --- | --- |
| Second lean | 20 | 20 | 20 |
| Canal fat | 28.4 | 28.4 | 28.4 |
| Crust emulsion | 7 | 7 | 7 |
| Fat emulsion | 8.45 | 8.45 | 8.45 |
| Water/ice | csp 100 | csp 100 | csp 100 |
| Additive in the invention | 0.6 | — | — |
| Sodium caseinate | — | 1 | — |
| Soya protein in isolated form | — | — | 1.3 |
| Phosphate | 0.35 | 0.35 | 0.35 |
| Nitrite | 0.015 | 0.015 | 0.015 |
| Isoascorbate | 0.05 | 0.05 | 0.05 |
| Dextrose | 0.3 | 0.3 | 0.3 |
| Maltodextrin | 0.6 | 0.6 | 0.6 |
| Salt | 2 | 2 | 2 |
| Aroma/colour | 0.2 | 0.2 | 0.2 |
| Starch | 2 | 2 | 2 |
| TOTAL | 100 | 100 | 100 |

[csp 100: amount sufficient for 100%]

These fine paste preparations were prepared using the procedure that is described below. First of all, a purée was prepared in a cutter; this purée consisted of 20% water and the emulsifier used in each case [additive in the invention (SSL and carragenate ι), sodium caseinate or soya protein in isolated form], mixed and shaken for approximately 1 minute. Then, the lean meat, the salt, the phosphate and the nitrite were added. After that, the crust emulsion and the fat emulsion were added and, then, the canal fat and one quarter of the water. After these operations had been completed, the rest of the ingredients and the water were added (except for the starch), and, finally, the starch was added (final temperature 12 to 13° C.)

The texture of the fine paste that was obtained using the additive that is the subject of this invention was very similar to that of caseinate, but shinier and the cost was 40% cheaper than the cost of making the fine paste using caseinate.

As far as the fine paste made using soya protein in isolated form was concerned, the sensory characteristics, flavour, etc., of the fine paste obtained using the additive that is the subject of this invention, were much better, and the cost was approximately 70% of the cost involved in obtaining the fine paste with the soya protein in isolated form.

The resulting emulsion was stable in all cases.

EXAMPLE 3

Preparation of a Pâté

The pâté that is shown in Table 2 was prepared using the additive that is the subject of this invention (SSL and carragenate ι), sodium caseinate or soya protein in isolated form.

TABLE 2

Preparation of pâté

| Ingredients | % |
| --- | --- |
| Liver | 25 |
| Flesh from below chin | 31 |
| Canal fat | 19 |
| Whole egg | 3 |
| Water/stock | csp 100 |
| Salt | 2 |
| Fried onion | 1-3 |
| Condiments/aroma | 0.6 |
| Sodium Tripolyphosphate | 0.28 |
| Potassium Nitrate | 0.01 |
| Sodium Nitrite | 0.01 |
| Ascorbate | 0.05 |
| Sugar/dextrose | 0.2 |
| Additive for the invention | 0.6 |
| Total | 100 |

[csp 100: amount sufficient for 100%]

That pâté was prepared following the procedure that is described below. The following were added to a cutter, in the order that is shown below:

a) Half the water and the additive that is the subject of this invention;
b) The liver (after it had been partially salted and nitrified);
c) All the products in powdered form except the ascorbate;
d) The rest of the water;
e) The scalded fat; and
f) The ascorbate.

As soon as all the components had been added, the cooking and sterilising process for the resulting mixture was started.

We claim:

1. A food additive that contains sodium stearyl-2-lactilate (SSL) and carragenate ι, wherein the weighted ratio of SSL:carragenate is such that the amount of SSL is greater than the amount of carragenate ι.

2. Additive according to claim 1, in which the weighted ratio SSL:carragenate ι ranges between 1:1 to 15:1, wherein the weighted ratio of SSL:carragenate is such that the amount of SSL is greater than the amount of carragenate ι.

3. Additive according to claim 2, in which the weighted ratio SSL:carragenate ι ranges between 1:1 to 10:1, wherein the weighted ratio of SSL:carragenate is such that the amount of SSL is greater than the amount of carragenate ι.

4. Additive according to claim 3, in which the weighted ratio SSL:carragenate ι is 5:1.

5. Additive according to claim 1, in which the SSL is completely or partially neutralised.

6. Additive according to claim 1, which also contains a sucroester.

7. Additive according to claim 6, in which the sucroester is selected from the group consisting of saccharose stearate, saccharose palmatite, saccharose oleate, and mixtures thereof.

8. Additive according to any one of claims 2-4 and 5-7 further comprising sodium stearate.

9. A procedure for preparing a food additive according to claim 1, comprising mixing the SSL with the carragenate ι.

10. Procedure according to claim 9, wherein the SSL has been neutralised by adding a base thereto.

11. Procedure according to claim 9, wherein the carragenate ι comprises an inert support.

12. Procedure according to claim 11, wherein the inert support is a maltodextrin.

13. A food product containing a food additive according to claim 1.

14. A food product according to claim 13, wherein the food product is selected from the group consisting of meat derivatives, emulsified sausage, cured sausage, pates, melted cheeses, fillings, sauces, precooked foodstuffs, croquettes, soups, bread dough, and bun dough.

15. A food product containing a food additive according to claim 2.

16. A food product according to claim 15, wherein the food product is selected from the group consisting of meat derivatives, emulsified sausage, cured sausage, pates, melted cheeses, fillings, sauces, precooked foodstuffs, croquettes, soups, bread dough, and bun dough.

17. A food product containing a food additive according to claim 3.

18. A food product according to claim 17, wherein the food product is selected from the group consisting of meat derivatives, emulsified sausage, cured sausage, pates, melted cheeses, fillings, sauces, precooked foodstuffs, croquettes, soups, bread dough, and bun dough.

19. A food product containing a food additive according to claim 5.

20. A food product according to claim 19, wherein the food product is selected from the group consisting of meat derivatives, emulsified sausage, cured sausage, pates, melted cheeses, fillings, sauces, precooked foodstuffs, croquettes, soups, bread dough, and bun dough.

21. A food product containing a food additive according to claim 6.

22. A food product containing a food additive according to claim 1, and further comprising sodium stearate.

23. A food product according to claim 22, wherein the food product is selected from the group consisting of meat derivatives, emulsified sausage, cured sausage, pates, melted cheeses, fillings, sauces, precooked foodstuffs, croquettes, soups, bread dough, and bun dough.

24. A food product containing a food additive according to claim 2, and further comprising sodium stearate.

25. A food product according to claim 24, wherein the food product is selected from the group consisting of meat derivatives, emulsified sausage, cured sausage, pates, melted cheeses, fillings, sauces, precooked foodstuffs, croquettes, soups, bread dough, and bun dough.

26. A food product containing a food additive according to claim 5, and further comprising sodium stearate.

27. A food product according to claim 26, wherein the food product is selected from the group consisting of meat derivatives, emulsified sausage, cured sausage, pates, melted cheeses, fillings, sauces, precooked foodstuffs, croquettes, soups, bread dough, and bun dough.

28. A food product containing a food additive according to claim 6, and further comprising sodium stearate.

29. A food product according to claim 28, wherein the food product is selected from the group consisting of meat derivatives, emulsified sausage, cured sausage, pates, melted cheeses, fillings, sauces, precooked foodstuffs, croquettes, soups, bread dough, and bun dough.

30. A procedure for preparing a food additive according to claim 2, comprising mixing the SSL with the carragenate ι.

31. Procedure according to claim 30, wherein the SSL has been neutralized by adding a base thereto.

32. Procedure according to claim 30, wherein the carragenate ι comprises an inert support.

33. A procedure for preparing a food additive according to claim 3, comprising mixing the SSL with the carragenate ι.

34. Procedure according to claim 33, wherein the SSL has been neutralized by adding a base thereto.

35. Procedure according to claim 33, wherein the carragenate ι comprises an inert support.

36. A procedure for preparing a food additive according to claim 4, comprising mixing the SSL with the carragenate ι.

37. Procedure according to claim 36, wherein the SSL has been neutralized by adding a base thereto.

38. Procedure according to claim 36, wherein the carragenate ι comprises an inert support.

39. A procedure for preparing a food additive according to claim 5, comprising mixing the SSL with the carragenate ι.

40. Procedure according to claim 39, wherein the SSL has been neutralized by adding a base thereto.

41. Procedure according to claim 39, wherein the carragenate ι comprises an inert support.

42. A procedure for preparing a food additive according to claim 6, comprising mixing the SSL with the carragenate ι.

43. Procedure according to claim 42, wherein the SSL has been neutralized by adding a base thereto.

44. Procedure according to claim 42, wherein the carragenate ι comprises an inert support.

* * * * *